Nov. 5, 1957  J. A. MILLIGAN  2,811,957
AIR COOLED ENGINE
Filed Oct. 10, 1955  3 Sheets-Sheet 1

INVENTOR:
JAMES A. MILLIGAN
BY: *[signature]*
AGENT

Nov. 5, 1957  J. A. MILLIGAN  2,811,957
AIR COOLED ENGINE

Filed Oct. 10, 1955  3 Sheets-Sheet 3

INVENTOR:
JAMES A. MILLIGAN
BY
AGENT

United States Patent Office 2,811,957
Patented Nov. 5, 1957

2,811,957

AIR COOLED ENGINE

James A. Milligan, Davenport, Iowa, assignor to J. I. Case Company, Racine, Wis., a corporation of Wisconsin Application October 10, 1955, Serial No. 539,321

2 Claims. (Cl. 123—41.65)

The invention pertains to gasoline engines, and, more specifically, it pertains to a means for air-cooling gasoline engines.

It is an object of this invention to provide a means for air-cooling gasoline engines in a highly efficient manner. The accomplishment of this object produces the greatest cooling with a minimum of power required to drive the cooling fan.

Another object of this invention is to provide a means for uniformly air-cooling all of the cylinders of gasoline engines by employing a system of pressurizing the cooling air which is directed past the engine cylinders.

Other objects and advantages will become apparent upon reading the following description in conjunction with the accompanying drawings, wherein.

The same reference numerals refer to the same parts throughout the several views.

Figure 1:
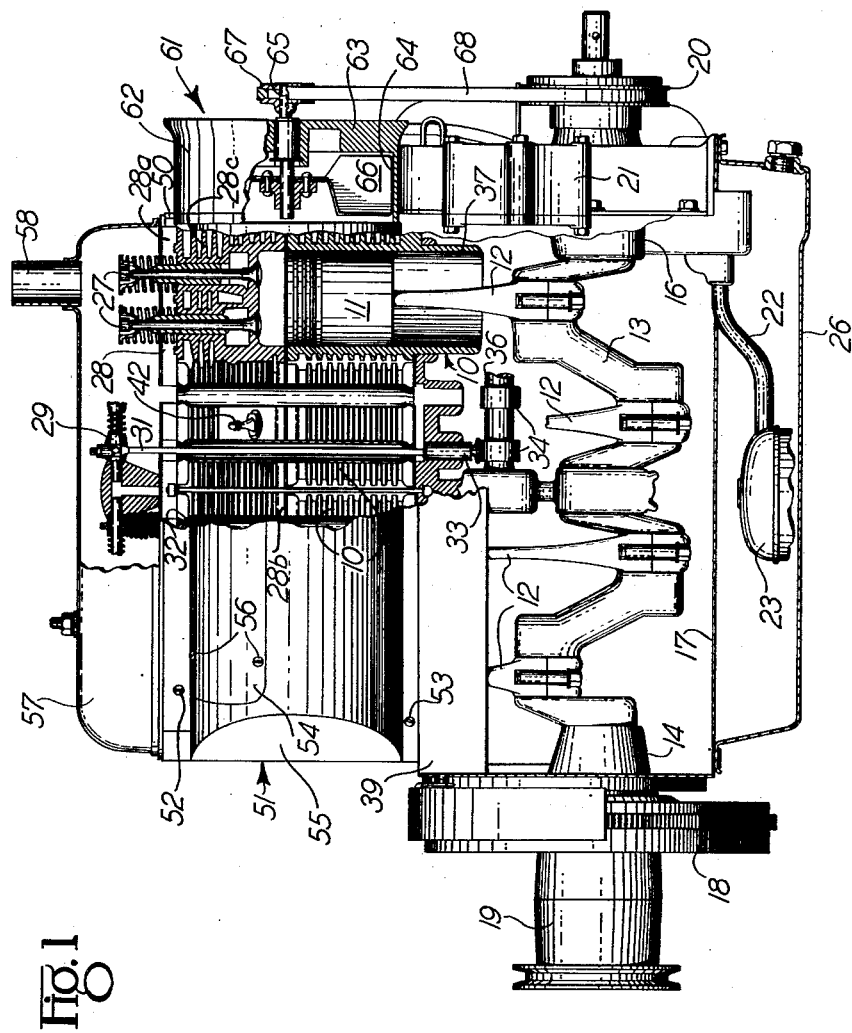
Fig. 1 is a side elevational view of a preferred embodiment of this invention with parts removed and parts broken away.

Fig. 1 shows a multi-cylinder engine including four cylinders 10, each having a piston such as the piston 11, disposed therewithin with a connecting rod 12 attached to each piston. The rods 12 are connected to the usual crank shaft 13 which is rotatably mounted in bearings 14 and 16 suitably anchored in the engine, while a usual housing 17 encloses the lower portion of the engine. One end of the crank shaft has the usual flywheel 18 and the belt pulley 19 is attached thereto while the opposite end has another pulley 20 suitably keyed thereto. Also, an oil pump 21 is mounted on the engine to connect by a tube 22 and through an intake float 23, with an oil reservoir defined by an oil pan 26.

The upper part of the engine includes the usual intake and exhaust valves 27 disposed within the cylinder head 28 to provide a pair of the valves 27 for each of the cylinders. Also, the usual rocker arms 29 are pivotally mounted above the cylinders to contact the valves 27 in the usual manenr and operate the latter in response to the rocker arm actuation caused by the push rods 31 disposed within push rod tubes 32. The lower ends of the rods abut valve tappets 33 which are in contact with cams 34 on the usual cam shaft 36 (fragmentarily shown) which is rotated in mesh with the crank shaft in the usual way. Of course, the push rods 31 and their associated parts are offset to one side of the cylinders 10.

Figure 2:
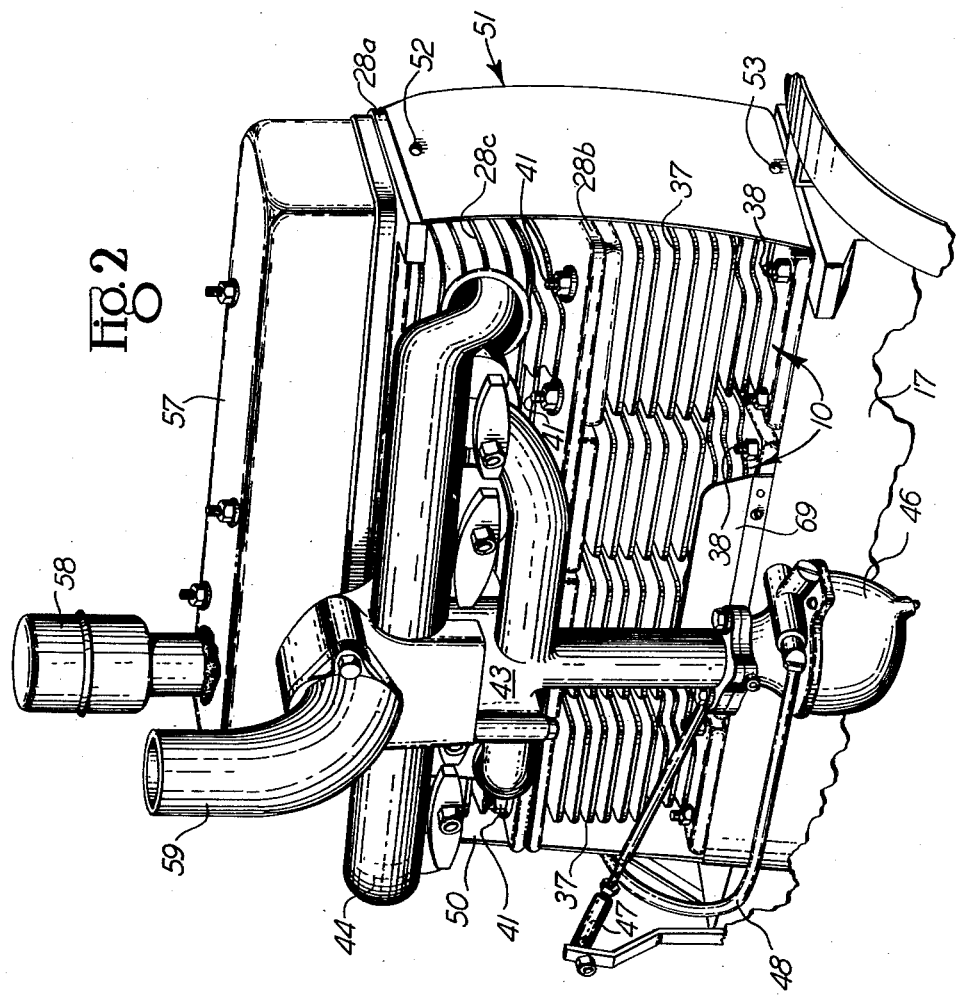
Fig. 2 is a side perspective view of the embodiment shown in Fig. 1 but shown from the opposite side.

The cylinders 10 include the usual cylinder barrels 37 which are bolted, by bolts 38 shown in Fig. 2, on the usual cylinder block 39, and the cylinder head 28 is likewise bolted to the barrels 37 by bolts 41. The head 28 includes the usual upper and lower plates 28a and 28b, respectively, with the four cylinder head finned portions 28c disposed therebetween for individual alignment with the cylinder barrels. Of course, both the cylinder barrels and the head have the usual integral cylinder fins for providing maximum cooling surface of the cylinders. The latter are spaced apart, as shown, to allow air to pass therebetween. The usual spark plugs 42 are attached at spaced points in the head 28.

Fig. 2 also shows the usual intake manifold 43 connected to the cylinder head 28, and the usual exhaust manifold 44 is similarly connected. Of course, the intake manifold is connected to the carburetor 46 which is suitably mounted adjacent the cylinder block 39. Also, the governor linkage 47 is shown connected to the carburetor, and the fuel line 48 is also connected thereto.

The foregoing refers to a conventional four cylinder gasoline engine. Since the constructional features referred to are conventional, no further description thereof is deemed to be necessary.

Figure 3:
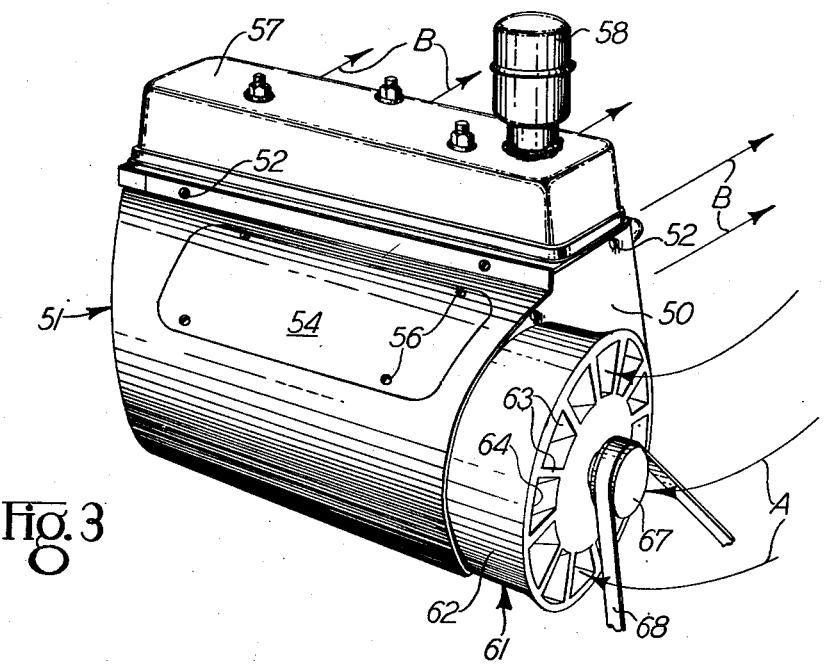
Fig. 3 is a side perspective view of the embodiment shown in Fig. 1, with parts removed and with the arrows showing the flow of the cooling air.
Figure 4:
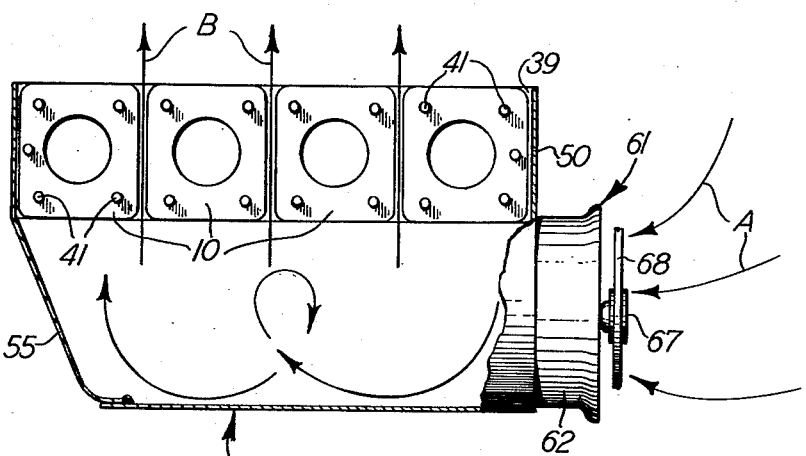
Fig. 4 is a diagrammatic and fragmentary top view of the embodiment shown in Fig. 1, with parts removed and with the arrows showing the flow of the cooling air.

The cylinders 10 are enclosed on three sides of the group of four thereof by a shroud or housing 51, shaped as shown, and it includes a piece 50 shown in Fig. 3. The shroud is spaced from the sides of the cylinders, as shown particularly in Fig. 4, and it has an angled side 55 for a purpose mentioned later. Also, it is suitably secured to the engine by bolts 52, attached to the cylinder head plate 28a, and bolt 53, attached to the cylinder block 39. Thus, the shroud is attached to the engine with that side of the cylinders shown in Fig. 2 not enclosed by the shroud 51. A panel 54 is removably secured by bolts 56, as a part of the shroud 51, and serves to define and cover an inspection opening in the shroud 51. Of course, removal of the panel permits access to the cylinders 10 on the shrouded side of the latter. Also, suitably mounted on the engine is a valve cover 57 which is hollowed, as shown in Fig. 1, and the usual oil filler cap 58 and exhaust stack 59 are shown in Fig. 2.

Aligned with the offset of the shroud 51 and secured to the engine is an axial flow fan 61. The latter includes a housing 62 having vanes 63 in the front of the fan through which the cooling air enters as shown by the arrows "A" of Figs. 3 and 4. The housing 62 includes an inner bore 64 which is shaped like a venturi. Fig. 1 shows a fan shaft 65 rotatably mounted in the housing 62 with fan blades 66 mounted on the shaft 65 to rotate with the latter. The blades 66 extend to within a small clearance of the bore 64 in the housing and also the rear ends of the vanes 63, as shown. The blades are, of course, pitched, and the vanes are angled in the direction opposite to the blade pitch, as shown between Figs. 1 and 3. Thus, with this arrangement, the fan 61 is an axial flow fan and the vanes 63 act as a check valve to prevent a back-flow of air and thereby make the unit perform as a compressor. The minimum spacing between the radially outer edges or tips of the blades 66 and the diameter of the venturi prevents the reverse flow of air at the blade tips even though there is a greater air pressure on the discharge side of the fan than the pressure on the fan inlet side.

A pulley 67 is attached to the shaft 65 to receive a belt 68 also engaged with the larger pulley 20 on the end of the crank shaft. In this manner of providing a well-known type of drive, the fan is rotated off the crank shaft but at a faster speed than the speed of the crank shaft. Since the fan moves air into the venturi and, consequently, into the shroud 51, the air in the shroud is under pressure and it can escape only past the cylinders 10. The latter are, therefore, cooled by the escaping air passing over the fins of the cylinders, as shown by the arrows in Fig. 4, and the air continues away from the engine, as indicated by the arrows "B" of Figs. 4 and 3. The shroud angled side 55 baffles the air into a continuously flowing path without a dead air space in the shroud 51.

Since the air is under pressure in the shroud 51, the air is equally pressurized throughout the shroud and it must, therefore, escape at equal rates past the cylinders and thereby uniformly cool the latter.

Fig. 2 shows a baffle 69 attached to the two middle cylinders 10 to angle upwardly and away from the cylinders. The baffle is thus disposed in front of the carburetor 46 and protects the latter from being heated by the air blowing past the cylinders.

While a specific object of this invention has been shown and described, it should be obvious that certain changes could be made in the embodiment, and the invention should, therefore, be limited only by the scope of the appended claims.

I claim:

1. In an air-cooled type of engine having a plurality of aligned cylinders compactly disposed to have restricted air spaces therebetween, the combination of an axial flow fan mounted on said engine beyond one end of and offset from the line of said cylinders to one side thereof, said fan including rotatable fan blades and a housing with the latter being disposed radially proximate of said blades and said fan including a plurality of fixed vanes disposed across the air intake side of said housing in advance of said fan and disposed to direct the flow of intake air into said fan at an angle counter to the direction of rotation of said blades, said vanes and said blades having their adjacent edges substantially parallel to each other, a shroud attached to said engine to be disposed thereon at said one side of said cylinders and be in air communication with the air discharge side of said housing for receiving air from said fan between said cylinders and said housing and causing said air to be pressurized within said housing.

2. In an air-cooled engine having a shroud, in combination, a fan unit comprising a housing having a cylindrical bore and being secured to said shroud, a plurality of fixed radial vanes disposed within said bore and disposed so as to deflect an axial flow of air passing through said housing obliquely to the axis thereof, and a rotating fan having an axis of rotation common to the axis of said housing being positioned rearwardly of said vanes, and having a plurality of blades directed at an angle opposed to that of said fixed vanes and having the edges thereof adjacent asid fixed vanes subtsantially coinciding with those of said fixed vanes, and of a peripheral diameter substantially coincidental with that of said cylindrical bore.

References Cited in the file of this patent

UNITED STATES PATENTS

| | | |
|---|---|---|
| 1,683,602 | Brockway | Sept. 11, 1928 |
| 2,595,175 | Sonderegger | Apr. 29, 1952 |
| 2,699,764 | Kiekhaefer | Jan. 18, 1955 |

FOREIGN PATENTS

| | | |
|---|---|---|
| 837,616 | Germany | Apr. 28, 1952 |